Dec. 4, 1923.                                                      1,476,353
                            R. M. BABBITT
                 ANTISLIP DEVICE FOR MOTOR VEHICLE WHEELS
                           Filed Dec. 8, 1921
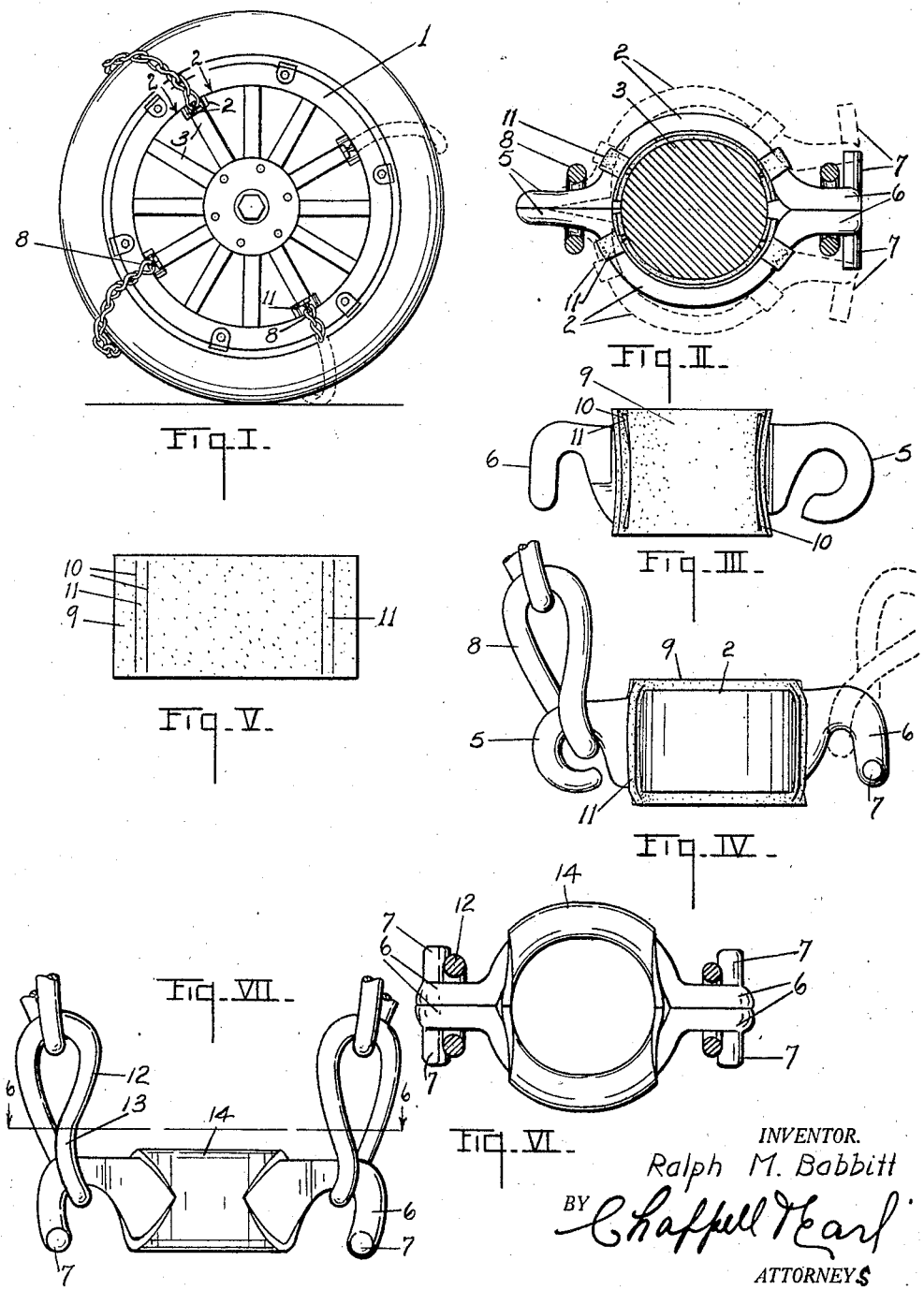
INVENTOR.
Ralph M. Babbitt
BY Chappell Earl
ATTORNEYS Patented Dec. 4, 1923.

1,476,353

UNITED STATES PATENT OFFICE.

RALPH M. BABBITT, OF KALAMAZOO, MICHIGAN.

ANTISLIP DEVICE FOR MOTOR-VEHICLE WHEELS.

Application filed December 8, 1921. Serial No. 520,802.

*To all whom it may concern:*

Be it known that I, RALPH M. BABBITT, a citizen of the United States, residing at the city and county of Kalamazoo, State of Michigan, have invented certain new and useful Improvements in Antislip Devices for Motor-Vehicle Wheels, of which the following is a specification.

This invention relates to improvements in anti-slip devices for motor vehicle wheels.

The main objects of the invention are:

First, to provide an improved anti-slip device which may be quickly attached to or removed from the wheel without jacking up the wheel.

Second, to provide an improved anti-slip device for motor vehicle wheels which is very simple and economical in structure and permits the ready renewal of tread chains as may be desired.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawings forming a part of this application, in which:

Fig. I is a side view of a wheel equipped with four of my improved anti-slip devices.

Fig. II is a sectional view on a line corresponding to line 2—2 of Fig. I.

Fig. III is an inside view of one of the yoke members.

Fig. IV is a side view of my improved device.

Fig. V is a plan view of one of the facings for yoke members.

Fig. VI is a sectional view taken on line 6—6 of Fig. VII showing a slight modification of the yoke.

Fig. VII is a side elevation of the embodiment of my invention shown in Fig. VI.

In the drawings similar reference characters refer to similar parts throughout the several views, and the sectional views are taken looking in the direction of the little arrows at the ends of the section lines.

Referring to the drawings, the wheel 1 is shown conventionally. My anti-slip device comprises a pair of yoke members 2 disposed in opposed relation and adapted to embrace a spoke 3 of the wheel and rest against the inner side of the felly, as is illustrated in Fig. I. Each yoke member is provided with hook-like lugs 5 and 6 at the ends thereof, the lugs of the two members lying side by side in coacting pairs, as shown in Fig. II. The pair of lugs 6 has laterally projecting head portions 7 which, when the parts are in position on a spoke, lie side by side, constituting heads for one pair of hooks detachably retaining a link of the tread chain 8 in engagement therewith.

The pair of hook lugs 5 is engaged with a link of the opposite end of the tread chain, this link constituting a coupling member for the yoke members. The lugs 5 are closed so that the link does not become disengaged except by the opening of the hooks, so that the link constitutes a coupling member for the yoke members. When the links are engaged with both pairs of lugs the parts are held in coacting relation in engagement with the spoke, but the link can be easily manipulated from the lugs 6, thereby permitting the removal of the yoke members from the spoke.

I preferably provide a facing 9 having spaced slits 10 adjacent the ends thereof forming straps 11 so that the straps may be manipulated over the hooks 5 and support the facings in position.

I have found in practice that raw hide is satisfactory for these facings. The facings effectively prevent marring of the fellies and spokes, so that the devices may be used on pleasure vehicles as well as trucks and the like.

In the embodiment shown in Figs. VI and VII both pairs of lugs are provided with the head portion 7. The link 12 at one end of the tread chain is in this embodiment partially closed up at 13 so that it cannot be manipulated over the head members, thus serving the same function as closing up the lug 5 in the other embodiment illustrated. The guards or facings 14 in this embodiment are pieces of rubber hose slipped into place.

My improved anti-slip device may also be used on wire wheels, there being very little strain on the spokes in use.

Having thus described my invention, what I claim as new desire to secure by Letters Patent, is—

1. An anti-slip device comprising a pair of opposed segmental yoke members adapted to embrace a spoke and rest against the inner side of a felly and each having a hook at each end, the hooks of the members lying side by side in coacting pairs, and a tread chain having a link at one end engaging one pair of hooks and constituting a coupling for the yoke members, the other pair of hooks being provided with lateral projections at their tips constituting a crosshead for detachably retaining a link at the opposite end of the tread chain in engagement therewith.

2. An anti-slip device comprising a pair of opposed segmental yoke members adapted to embrace a spoke and rest against the inner side of a felly and each having a hook at each end, the hooks of the members lying side by side in coacting pairs, and a tread chain having a link at one end engaging one pair of hooks and constituting a coupling for holding the yoke members together when they are disengaged from a wheel, said chain being detachably engageable with the other pair of hooks for detachably securing said yoke members in engagement with the spoke of a wheel.

In witness whereof, I have hereunto set my hand and seal.

RALPH M. BABBITT. [L. S.]